United States Patent
Marathe et al.

(10) Patent No.: US 11,321,117 B2
(45) Date of Patent: May 3, 2022

(54) PERSISTENT MULTI-WORD COMPARE-AND-SWAP

(71) Applicant: Oracle International Corporation, Redwood City, CA (US)

(72) Inventors: Virendra J. Marathe, Florence, MA (US); Matej Pavlovic, Lausanne (CH); Alex Kogan, Burlington, MA (US); Timorthy L. Harris, Cambridge (GB)

(73) Assignee: Oracle International Corporation, Redwood City, CA (US)

( * ) Notice: Subject to any disclaimer, the term of this patent is extended or adjusted under 35 U.S.C. 154(b) by 26 days.

(21) Appl. No.: 16/894,626

(22) Filed: Jun. 5, 2020

(65) Prior Publication Data

US 2020/0301730 A1    Sep. 24, 2020

Related U.S. Application Data (63) Continuation of application No. 16/275,175, filed on Feb. 13, 2019, now Pat. No. 10,678,587.

(Continued)

(51) Int. Cl.
*G06F 12/00* (2006.01)
*G06F 9/46* (2006.01)
(Continued)

(52) U.S. Cl.
CPC ............ *G06F 9/467* (2013.01); *G06F 9/3004* (2013.01); *G06F 9/30021* (2013.01);
(Continued)

(58) Field of Classification Search
CPC .... G06F 9/467; G06F 9/30021; G06F 9/3004; G06F 9/3834; G06F 9/522;
(Continued)

(56) References Cited

U.S. PATENT DOCUMENTS

| | | | |
|---|---|---|---|
| 10,678,587 B2 | 6/2020 | Marathe et al. | |
| 2014/0089264 A1* | 3/2014 | Talagala | G06F 3/0616 |
| | | | 707/649 |

(Continued)

FOREIGN PATENT DOCUMENTS

WO    2017013202    1/2017

OTHER PUBLICATIONS

Tianzheng Wang, et al., "Easy Lock-Free Indexing in Non-Volatile Memory", ACM, MSR Tech Report, Aug. 2017, pp. 1-13.

(Continued)

*Primary Examiner* — Shawn X Gu
(74) *Attorney, Agent, or Firm* — Robert C. Kowert; Kowert, Hood, Munyon, Rankin & Goetzel, P.C.

(57) ABSTRACT

A computer system including one or more processors and persistent, word-addressable memory implements a persistent atomic multi-word compare-and-swap operation. On entry, a list of persistent memory locations of words to be updated, respective expected current values contained the persistent memory locations and respective new values to write to the persistent memory locations are provided. The operation atomically performs the process of comparing the existing contents of the persistent memory locations to the respective current values and, should they match, updating the persistent memory locations with the new values and returning a successful status. Should any of the contents of the persistent memory locations not match a respective current value, the operation returns a failed status. The operation is performed such that the system can recover from any failure or interruption by restoring the list of persistent memory locations.

20 Claims, 6 Drawing Sheets

Related U.S. Application Data (60) Provisional application No. 62/710,420, filed on Feb. 16, 2018.

(51) Int. Cl.
| | |
|---|---|
| *G06F 9/38* | (2018.01) |
| *G06F 9/30* | (2018.01) |
| *G06F 12/0815* | (2016.01) |
| *G06F 9/52* | (2006.01) |
| *G06F 12/0804* | (2016.01) |
| *G06F 11/14* | (2006.01) |
| *G06F 12/02* | (2006.01) |

(52) U.S. Cl.
CPC ........... *G06F 9/3834* (2013.01); *G06F 9/522* (2013.01); *G06F 11/1446* (2013.01); *G06F 11/1448* (2013.01); *G06F 11/1458* (2013.01); *G06F 11/1471* (2013.01); *G06F 12/0238* (2013.01); *G06F 12/0804* (2013.01); *G06F 12/0815* (2013.01)

(58) Field of Classification Search
CPC ............. G06F 12/0804; G06F 12/0815; G06F 12/0238; G06F 12/0246; G06F 11/1446; G06F 11/1448; G06F 11/1458; G06F 11/1471

See application file for complete search history.

(56) References Cited

U.S. PATENT DOCUMENTS

| | | |
|---|---|---|
| 2014/0281269 A1 | 9/2014 | Chakrabarti et al. |
| 2015/0355981 A1 | 12/2015 | Booss et al. |
| 2018/0046556 A1 | 2/2018 | Marathe et al. |

OTHER PUBLICATIONS

Timothy L. Harris, et al., "A Practical Multi-Word Compare-and Swap Operation", International Symposium on Distributed Computing, 2002, pp. 1-15.

Mengxing Liu, et al., DudeTM: Building Durable Transactions with Decoupling for Persistent Memory, ASPLOS '17, ACM, Apr. 8-12, 2012, pp. 329-343.

Jeremy Condit, et al., "Better I/O Through Byte-Addressable, Persistent Memory", SOSP '09, ACM, Oct. 11-14, 2009, pp. 1-14.

Kumud Bhandari, et al., Makalu: Fast Recoverable Allocation of Non-volatile Memory, OOPSLA '16, ACM, Nov. 2-4, 2016, pp. 677-694.

B. Bridge. "NVM Direct API", NVM Direct Library, https://github.com/oracle/nvm-direct, 2015, pp. 1-101.

Dhruva R. Chakrabarti, et al., "Atlas: Leveraging Locks for Non-volatile Memory Consistency", In Proceedings of the 2014 ACM International Conference on Object Oriented Programming Systems Languages & Applications, OOPSLA 2014,Oct. 20-24, 2014, pp. 433-452.

Joel Coburn, et al., "NV-Heaps: Making Persistent Objects Fast and Safe with Next-Generation, Non-Volatile Memories", ASPLOS '11, ACM, Mar. 5-11, 2011, pp. 1-13.

Ellis R. Giles, et al., "SoftWrAP: A Lightweight Framework for Transactional Support of Storage Class Memory", In IEEE 31st Symposium on Mass Storage Systems and Technologies, MSST 2015, May 30-Jun. 5, 2015, pp. 1-14.

Michael Greenwald, "Two-Handed Emulation: How to build non-blocking implementations of complex data-structures using DCAS", In Proceedings of the Twenty-First Annual ACM Symposium on Principles of Distributed Computing, 2002, pp. 260-269.

M. Hosomi, et al, "A Novel Nonvolatile Memory with Spin Torque Transfer Magnetization Switching: Spin-RAM", International Electron Devices Meeting, 2005, pp. 459-462.

Yiming Huai, "Spin-Transfer Torque MRAM (STT-MRAM): Challenges and Prospects", AAPPS Bulletin Dec. 2008, vol. 18, No. 6, pp. 33-40.

Joseph Izraelevitz, et al., "Linearizability of Persistent Memory Objects under a Full-System-Crash Failure Model", In Distributed Computing—30th International Symposium, 2016, pp. 313-327.

Arpit Joshi, et al., "Efficient Persist Barriers for Multicores", ACM, MICRO-48, Dec. 5-9, 2015, pp. 1-12.

Aasheesh Killi, et al., "High-Performance Transactions for Persistent Memories", ACM, ASPLOS '16, Apr. 2-6, 2016, pp. 399-411.

Amirsaman Memaripour, et al., "Atomic In-place Updates for Non-volatile Main Memories with Kamino-Tx", ACM, EuroSys '17, Apr. 23-26, 2017, pp. 499-512.

Faisal Nawab, et al., "Procrastination Beats Prevention: Timely Sufficient Persistence for Efficient Crash Resilience", In Proceedings of the 18th International Conference on Extending Database Technology, EDBT 2015, pp. 689-694.

Steven Pelley, et al., "Memory Persistency", In ACM/IEEE 41st International Symposium on Computer Architecture, ISCA 2014, Jun. 14-18, 2014, pp. 265-276.

S. Raoux, et al., "Phase-change random access memory: A scalable technology", IBM Journal of Research and Development, vol. 52, No. 4/5, Jul./Sep. 2008, pp. 465-479.

James R., "Transactional Synchronization in Haswell", Retrieved from https://software.intel.com/en-us/blogs/2012/02/07/transactional-synchron . . . , 2012, pp. 1-8.

Dmitri B. Strukov, et al., "The missing memristor found", Nature PublishingGroup, vol. 453, May 2008, pp. 80-83.

Haris Volos, et al., "Mnemosyne: Lightweight Persistent Memory", ACM, ASPLOS '11, Mar. 5-11, 2011, pp. 1-13.

\* cited by examiner

PERSISTENT MULTI-WORD COMPARE-AND-SWAP

This application is a continuation of U.S. patent application Ser. No. 16/275,175, filed Feb. 13, 2019, which claims benefit of priority to U.S. Provisional Patent Application No. 62/710,420 filed Feb. 16, 2018, which are herein incorporated by reference in their entirety.

BACKGROUND

Field of the Disclosure

This disclosure relates generally to concurrent programming and more particularly to systems and methods for performing atomic, multi-word updates to persistent word-addressable memory.

Description of the Related Art

Traditional computer architectures include one or more volatile, word-addressable memory arrays, such as static random access memory (SRAM) or dynamic random access memory (DRAM), and one or more non-volatile, block-addressable storage devices such as disk drives or flash memory. While volatile, word-addressable memory provides much lower access latencies, it is unsuitable for storing information which must be persistent. Therefore, persistent data must be stored in non-volatile memory where the data must be marshalled into streams and blocks to adapt to the underlying, block-based storage technology.

In complex, multiprocessing applications a persistent state of operation must frequently be maintained. As data associated with this state must reside on a non-volatile data store that is traditionally block-addressable, the management of this state information may result in significant performance bottlenecks in the application. These bottlenecks may be further aggravated by the need for the application to recover and resume operation from an interruption or failure that may occur at any time.

Emerging word-addressable persistent memory technologies, such as 3D XPoint, phase change memory, magneto-resistive random access memory and memristors, can fundamentally change the way applications represent and manage persistent data. In-memory data representations that have been used in the past to hide the high overheads of persistent storage could themselves become persistent by virtue of residing in word-addressable persistent memory. This opens the door to significant restructuring of applications to leverage the performance potential of these technologies. Fundamental data structures and programming primitives may need to be revised in view of these technologies.

SUMMARY

Methods and systems for providing an atomic, persistent multi-word compare-and-swap (PMCAS) are described. In a computer system including one or more processors and persistent, word-addressable memory, PMCAS operations can enable much faster persistent data structures than available alternatives. A principle challenge of the PMCAS operation is the non-persistence of memory caches which complicates the correct ordering of update persistence occurring within PMCAS operation.

A requirement of PMCAS operations is that they be recoverable from failure that may occur at any time. To accomplish this, the various embodiments of PMCAS operations disclosed herein have the characteristic of being durably linearizable such that any PMCAS operation can tolerate, and recover from, an interruption at any time.

In some embodiments, a list of persistent memory locations of words to be updated, respective expected current values contained the persistent memory locations and respective new values to write to the persistent memory locations are provided by an application. A PMCAS operation atomically compares the existing contents of the persistent memory locations to the respective current values and, should they match, updates the persistent memory locations with the new values and returns successful status. Should any of the contents of the persistent memory locations not match a respective current value, the operation instead returns a failed status. The operation is performed such that the system can recover from any failure or interruption by restoring the list of persistent memory locations to a state prior to the performance of the operation or subsequent to the performance of the operation.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

The specification includes references to word-addressable memory and block-addressable storage. In a word-addressable memory, the size of an addressable word is typically associated with a fundamental word size or data access size of the computer architecture. In some architectures, data sizes smaller than a word may only be accessed by accessing the word that contains them. In other architectures, sub-word sizes, for example, individual bytes, can be accessed. In all cases, a word-addressable memory is one where individual data elements accessible by the computer architecture itself can be accessed within the memory without first accessing a larger memory element, and the term "word-addressable memory" is not intended to be restricted to any particular word size. In contrast, a block-addressable storage is organized data in blocks, where a block contains multiple elements of the computer architecture's word size. When an application accesses a data word within a block-addressable storage, the system must first access the block containing the desired word. In the case of an update to such a word, the system must first read the containing block, update the word within the block, then save the block on the persistent memory device. Such an operation is commonly referred to a read-modify-write (RMW). Word-addressable memories are ones where RMW operations are not required to perform updates to individual words and, in some cases, to individual bytes within a word.

DETAILED DESCRIPTION OF EMBODIMENTS

Persistent memory technologies, such as 3D XPoint, phase change memory, magneto-resistive random access memory and memristors, are expected to come close to matching or even exceeding the performance of DRAM, with performance 100-1000× faster than NAND flash. These persistent memory technologies are word-addressable as opposed to the block-addressable nature of disks and flash memory. This addressability lends itself toward integrating non-volatile memories in systems on the memory bus rather than only across an I/O interface. These trends are poised to fundamentally change the landscape of I/O interfaces and software stacks where interfaces may need to be revised to leverage performance benefits enabled by word-addressability and I/O software stacks need to be redesigned to drastically reduce the code path to access persistent memory. In particular, word-addressability enables a DRAM-like load/store interface to persistence, which in turn unlocks opportunities to represent persistent data in high-performance memory as opposed to the traditional approach of marshalling the data in streams and blocks to adapt to the block-based interface of magnetic disks and flash memory. This could radically change how applications store and use persistent data.

The load/store interface to persistent memory is, however, not sufficient since the processor state and various layers in the memory hierarchy (e.g. store buffers, caches, memory, controller buffers) are expected to remain non-persistent in the foreseeable future. Applications need better primitives to control when data moves through the memory hierarchy layers to the persistent memory devices. To that end, processor vendors such as Intel have provided new hardware instructions to provide improved control of data flowing through the various layers of the cache and memory hierarchy. Using these new instructions, programmers must rebuild applications to leverage persistent memory. This is, however, a difficult task and, in many cases, an insurmountable challenge. For example, in the case where an application creates a data structure and assigns an address of the data structure to a variable, if both the data structure and the variable require persistence and are thereby stored in a persistent memory, it would not be sufficient to allow the various locations to be eventually committed to persistent memory as it flows through the memory hierarchy since a hardware failure could cause a loss of persistence that the application had assumed. Furthermore, it would also be insufficient for the application to signal, or force, the commitment of the data to persistent memory before proceeding since the order in which the various words were committed to memory may be unpredictable, leading to potential corruption of the persistent memory. In this simple case, it is clear that the programmer of the application must take care in ensuring that the various words are committed to persistent memory in a specific order. As the operations within an application become increasingly complex, modifying existing load-store techniques become increasingly challenging.

Recognizing these programming challenges, a transaction programming model to access and manipulate data on persistent memory has been considered. While transactions are a powerful abstraction to program persistent memory, they incur significant performance overheads. In addition, more efficient concurrent data structure implementations can be built without transactions using a simple multi-word compare-and-swap (MCAS) primitive. Various embodiments are disclosed that provide persistent MCAS (PMCAS) operation where multiple words in persistent memory can be updated atomically and in a fault-consistent manner.

Figure 1:
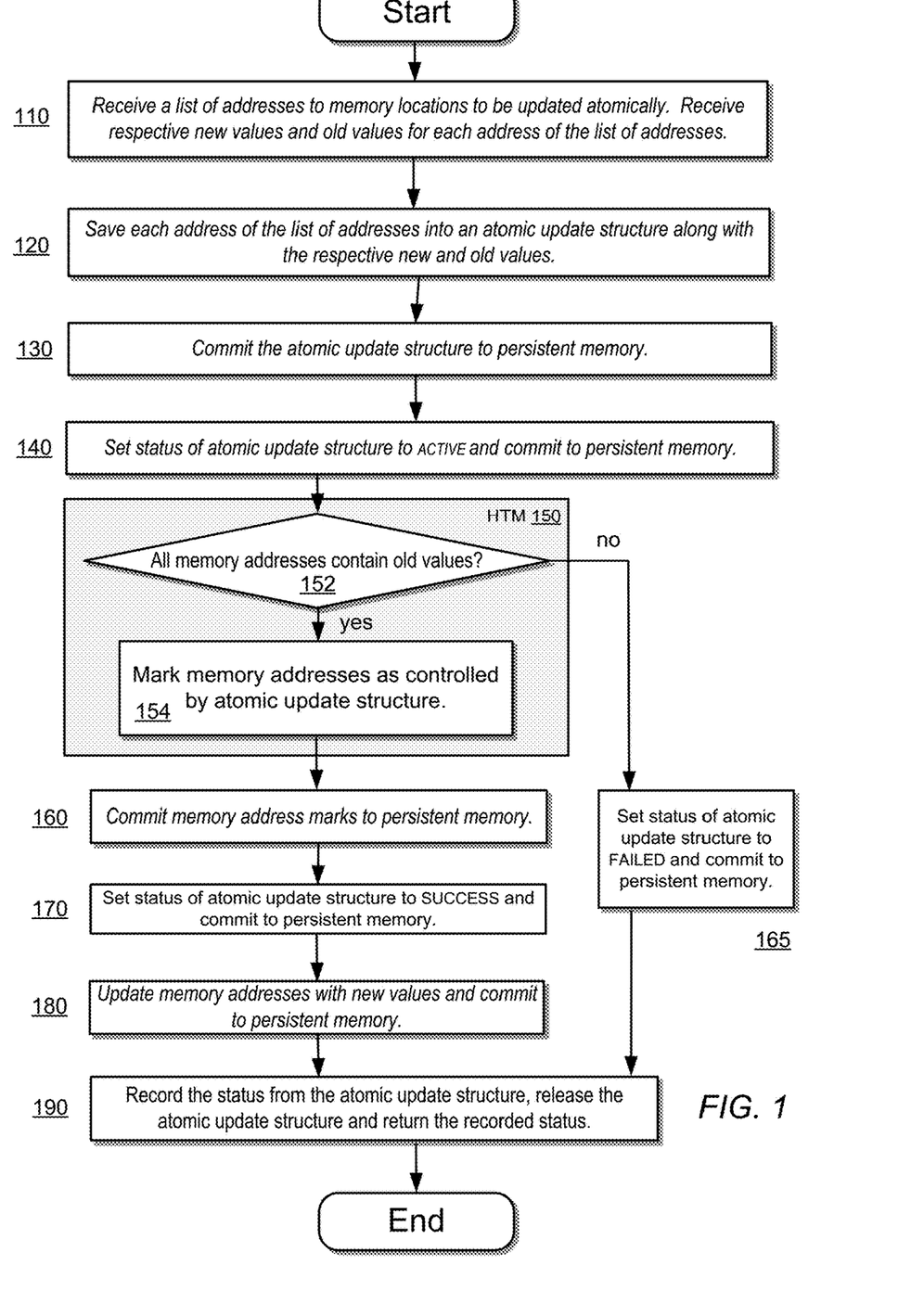
FIG. 1 is a flow diagram of a PMCAS operation using a hardware transactional memory (HTM) feature according to one embodiment.

FIG. 1 provides a flow diagram of one embodiment of a PMCAS operation using an HTM feature available in some contemporary processor architectures. HTM simplifies concurrent programming practices by performing multiple load and store instructions atomically. The HTM operation of FIG. 1, shown in block 150, allows steps 152 and 154 of the PMCAS operation to appear to be atomic to other processes or threads of an application.

The PMCAS operation starts at step 110 by receiving a list of addresses to memory locations that are to be updated atomically. These addresses may be sorted in a predefined order so that conflicts may be avoided with other, concurrent PMCAS operations. This order may be determined a number of possible ordering rules. For example, addresses may be sorted according to ascending or descending address value, according to order of allocation, or according to an order specified by an application. Furthermore, the order may be globally defined for all applications using PMCAS operations or may be defined separately for each application. It should be understood that these various ordering techniques are not intended to be limiting and that other techniques may be used provided that concurrent PMCAS operations sharing memory locations use the same ordering technique.

Along with this list of addresses is provided respective new values to store at the memory locations as well as respective old values of the locations for which the respective new values are based. The operation proceeds to step 120, where an atomic update structure is allocated and populated with the data received in step 110. This data structure will be retained by the system until the operation is complete as it will be needed in the event that recovery from failure needs to be performed.

Once the atomic update structure has been created, it may be committed to persistent memory in step 130. This operation consists of flushing all cache lines that may be storing elements of the data structure and then establishing a memory barrier. This memory barrier ensures that all memory operations prior to the barrier will be performed before any operations issued after the barrier. All subsequent persistent memory commits described herein follow the same update process of first flushing relevant cache locations and then setting a memory barrier.

Once the atomic update structure is committed to persistent memory in step 130, the status of the structure is set to ACTIVE and the status is committed to persistent memory in step 140. As part of setting the status to ACTIVE, the atomic update structure may also be added to a list of active atomic update structures and data associated with the list committed to persistent memory. The operation then proceeds to the HTM 150. For simplicity, it is assumed that the HTM operation executes to completion and that if the HTM operation is aborted it is transparently retried.

The HTM operation 150 consists of verifying that each of the memory locations described in the atomic update structure stores a respective old value as recorded in the structure. In the event one of the memory locations does not match its respective old value, the HTM operation exits and proceeds to step 165. At step 165, the status of the structure is set to FAILED and the status is committed to persistent memory. Once the status is committed, the operation proceeds to step 190 where the status is read from the structure, the structure removed from the list of active structures and the structure freed, and the status returned to the application. The operation then ends.

If, however, all memory locations match their respective old values, the HTM operation 150 proceeds to step 154 where each of the memory locations is marked as being controlled by the atomic update structure. To accomplish this, an identifier is written to each of the memory locations, the identifier including the address of the atomic update structure as well as a flag indicating that the address defines a controlling atomic update structure for the memory location. In one embodiment, this flag may be implemented by setting the least significant bit (LSB) of the atomic update structure address. Setting the LSB indicates that the memory location is under control by the atomic update structure specified in the remainder of the memory location. Using the LSB as a flag bit in this way imposes two restrictions: (1) the locations must be large enough to store a memory address and the atomic update structures must be aligned such that that the LSB their addresses is naturally cleared, and (2) that the LSB of data otherwise stored in a memory location is not set. It should be understood, however, that the use of the LSB of data is not intended to be limiting and that other embodiments of the identifier may use different representations of the flag bit, including other bits within the memory locations or explicit unions of data and flag information.

Once all locations are marked, the HTM operation ends and the PMCAS operation proceeds to step 160.

In step 160, all the memory locations set in step 154 are committed to persistent memory and the operation proceeds to step 170. In step 170 the status of the structure is set to SUCCESS and the status is committed to persistent memory. The operation then proceeds to step 180 where the memory locations are updated with the new values defined in the atomic update structure and the memory locations are committed to persistent memory. The operation then proceeds to step 190 where the status is read from the structure, the structure removed from the list of active structures and the structure freed, and the status returned to the application. The operation then ends.

Figure 2:
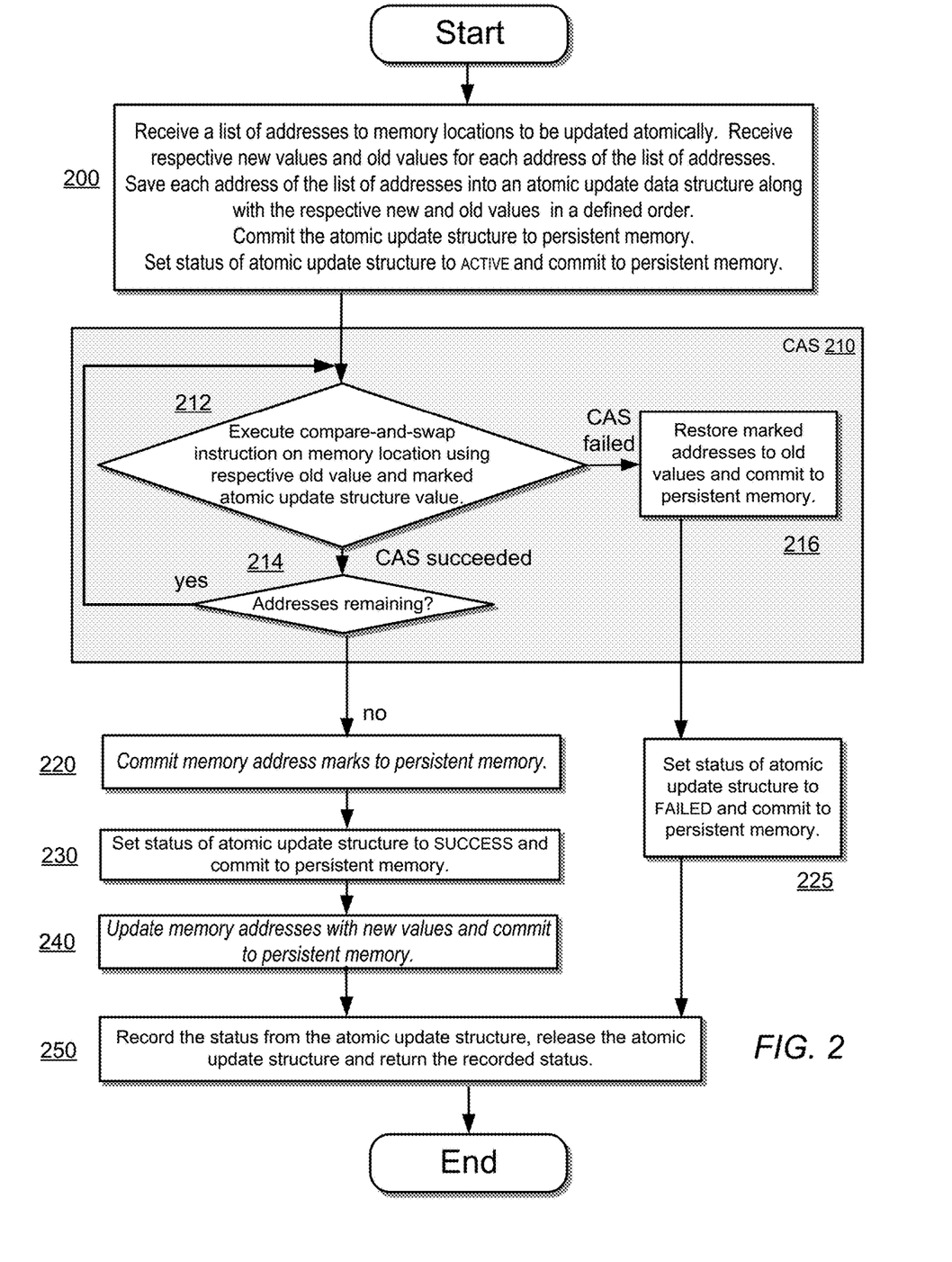
FIG. 2 is a flow diagram of a PMCAS operation using atomic compare-and-swap instructions according to one embodiment.

FIG. 2 provides a flow diagram of one embodiment of a PMCAS operation using atomic compare-and-swap (CAS) instructions available in some contemporary processor architectures. A CAS instruction compares the value at a provided memory address to a provided value and, if the values match, updates the contents at the provided address with a provided new value. If the values do not match, an error is indicated.

Similar to the embodiments of FIG. 1, the PMCAS operation starts at step 200 by receiving a list of addresses to memory locations that are to be updated atomically. These addresses may be sorted in a known order so that conflicts may be avoided with other, concurrent PMCAS operations as discussed above in FIG. 1. Along with this list of addresses is provided respective new values to store at the memory locations as well as respective old values of the locations for which the respective new values are based. The operation stores the received data in an allocated atomic update structure and commits to persistent memory. The operation then sets the status of the structure to ACTIVE and the status is committed to persistent memory. As part of setting the status to ACTIVE, the atomic update structure may also be added to a list of active atomic update structures and data associated with the list committed to persistent memory. While these various steps are all shown in a single step 200 for brevity, the steps must be executed in strict sequence as shown in FIG. 1. The operation then proceeds to the CAS module 210 where the memory locations are individually allocated for update using CAS instructions.

In step 212 of the CAS module 210, the address of a memory location along with its respective old value are provided to a CAS instruction. The CAS instruction compares the contents of the memory location to the old value and indicates a failure of the values do not match. If the values match, a marked value, as discussed in FIG. 1, of the atomic update structure is written to the memory location and a check for additional memory locations is performed at step 214. If the comparison fails, the operation proceeds to step 216.

If all memory locations as successfully allocated, the operation proceeds to step 220. In step 220, all the memory locations set by the CAS module 210 are committed to persistent memory and the operation proceeds to step 230. In step 230 the status of the structure is set to SUCCESS and the status is committed to persistent memory. The operation then proceeds to step 240 where the memory locations are updated with the new values defined in the atomic update structure and the memory locations are committed to persistent memory. The operation then proceeds to step 250 where the status is read from the structure, the structure removed from the list of active structures and the structure freed, and the status returned to the application. The process then ends.

If any of the CAS comparisons fail, however, the operation proceeds to step 216. At step 216, all memory locations whose CAS instruction succeeded will have memory location values that require restoring to their old values. As the memory location values matched the respective old values in the atomic update structure, otherwise the CAS instruction would have failed, all that is required is that the memory locations are updated with the old values 461. Once all values have been restored, the memory locations are committed to persistent memory and the operation proceeds to step 465. In step 465 the status of the structure is set to FAILED and the status is committed to persistent memory. The operation then proceeds to step 490 where the status is read from the structure, the structure removed from the list of active structures and the structure freed, and the status returned to the application. The process then ends.

Figure 3:
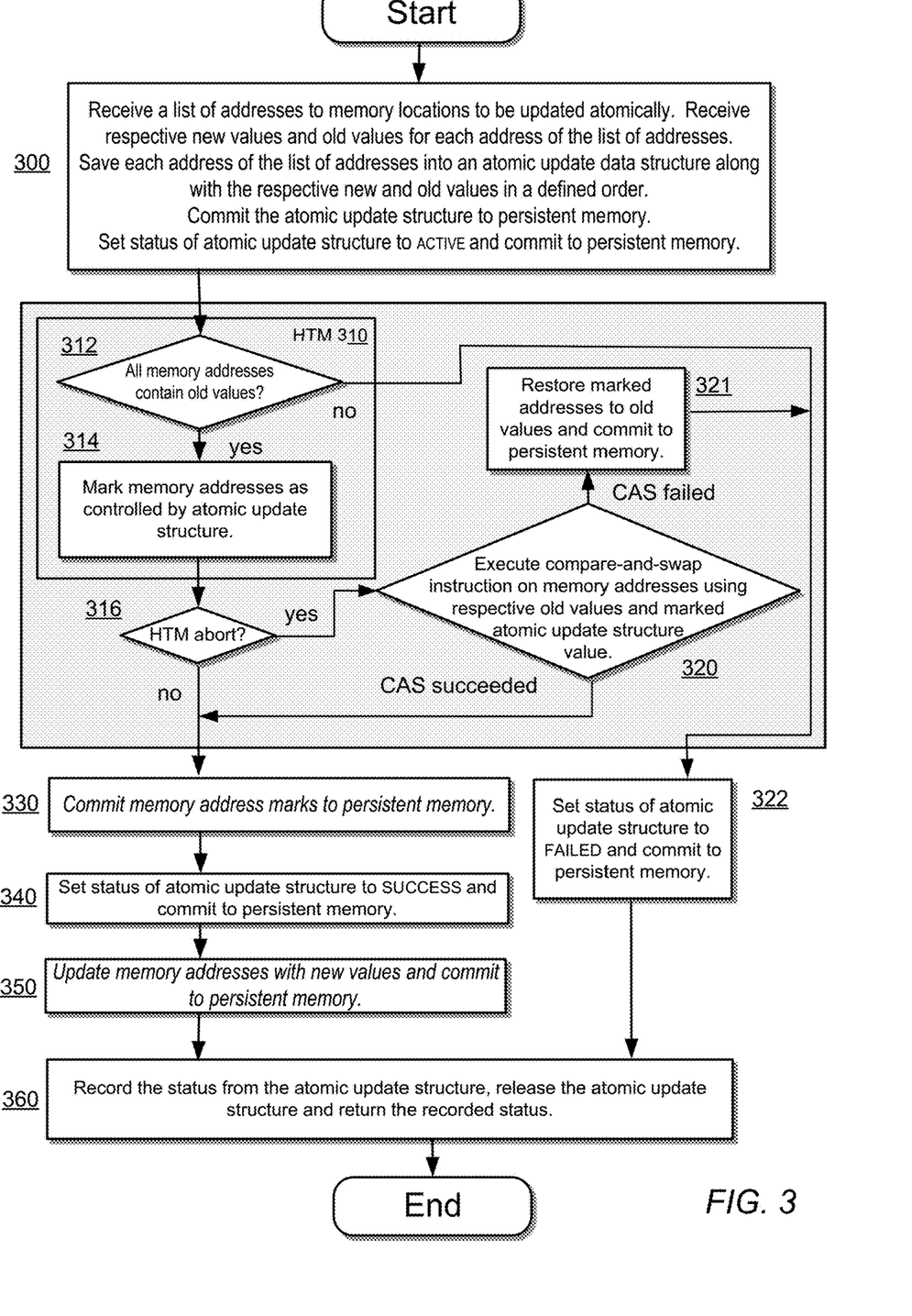
FIG. 3 is a flow diagram of a hybrid PMCAS operation combining the use an HTM feature and atomic compare-and-swap instructions according to one embodiment.

FIG. 3 provides a flow diagram of one embodiment of a PMCAS operation using a combination of an HTM feature and atomic compare-and-swap (CAS) instructions available in some contemporary processor architectures. Similar to the embodiments of FIG. 1 and FIG. 2, the PMCAS operation starts at step 300 by receiving a list of addresses to memory locations that are to be updated atomically. These addresses are sorted in globally known order so that conflicts may be avoided with other, concurrent PMCAS operations as discussed above in FIG. 1. Along with this list of addresses is provided respective new values to store at the memory locations as well as respective old values of the locations for which the respective new values are based. The operation stores the received data in an allocated atomic update structure and commits to persistent memory. The operation then sets the status of the structure to ACTIVE and the status is committed to persistent memory. As part of setting the status to ACTIVE, the atomic update structure may also be added to a list of active atomic update structures and data associated with the list committed to persistent memory. While these various steps are all shown in a single step 300 for brevity, the steps must be executed in strict sequence as shown in FIG. 1.

The operation then proceeds to the HTM 310. First, the HTM 310 attempts to lock all memory addresses in order to perform the atomic memory transaction. If the HTM 310 cannot lock all memory locations, the HTM operation exits and proceeds to step 320. Otherwise, the HTM 310 verifies that each of the memory locations described in the atomic update structure stores a respective old value as recorded in the structure. In the event one or more of the memory locations does not match its respective old value, the operation proceeds to step 322. In step 322 the status of the structure is set to FAILED and the status is committed to persistent memory. The operation then proceeds to step 360 where the status is read from the structure, the structure removed from the list of active structures and the structure freed, and the status returned to the application. The process then ends.

If, however, all memory locations match their respective old values, the HTM operation 310 proceeds to step 314 where each of the memory locations is marked as being controlled by the atomic update structure as discussed in FIG. 1. Once all locations are marked, the HTM operation ends and the PMCAS operation proceeds to step 330.

In step 330, all the memory locations set in step 314 are committed to persistent memory and the operation proceeds to step 340. In step 340 the status of the structure is set to SUCCESS and the status is committed to persistent memory. The operation then proceeds to step 350 where the memory locations are updated with the new values defined in the atomic update structure and the memory locations are committed to persistent memory. The operation then proceeds to step 360 where the status is read from the structure, the structure removed from the list of active structures and the structure freed, and the status returned to the application. The operation then ends.

If any of the memory locations do not match their respective old values, the HTM operation exits and proceeds to step 320. In step 320, for each memory location, the address of the memory location along with its respective old value are provided to a CAS instruction. The CAS instruction compares the contents of the memory locations to respective old values and indicates a failure if any the values do not match. If the values match, a marked value of the atomic update structure is written to the memory location as discussed in FIG. 1. If any the values do not match, the operation proceeds to step 321.

If all memory locations succeed at step 320, the operation proceeds to step 330. In step 330, all the memory locations set in either step 314 or step 320 are committed to persistent memory and the operation proceeds to step 340. In step 340 the status of the structure is set to SUCCESS and the status is committed to persistent memory. The operation then proceeds to step 350 where the memory locations are updated with the new values defined in the atomic update structure and the memory locations are committed to persistent memory. The operation then proceeds to step 360 where the status is read from the structure, the structure removed from the list of active structures and the structure freed, and the status returned to the application. The process then ends.

If, however, any of the CAS instructions fails, the operation proceeds to step 321. At step 321, all memory locations whose CAS instruction succeeded will have memory location values that require restoring to their old values. As the memory location values matched the respective old values in the atomic update structure, otherwise the CAS instruction would have failed, all that is required is that the memory locations are updated with the old values. Once all values have been restored, the memory locations are committed to persistent memory and the operation proceeds to step 322. In step 322 the status of the structure is set to FAILED and the status is committed to persistent memory. The operation then proceeds to step 360 where the status is read from the structure, the structure removed from the list of active structures and the structure freed, and the status returned to the application. The process then ends.

In the event a hardware failure occurs during the processing of a PMCAS operation, recovery from the hardware failure must occur. This recovery process is shown in the flow diagram of FIG. 4 in some embodiments. At the moment of the hardware failure, the system potentially contains a list of one or more atomic update structures that were in progress at the moment of the hardware failure. The status of each of these atomic update structures can contain one of three values, ACTIVE, FAILED or SUCCESS. At step 410 of the recovery process, the next available atomic update structure is selected. At step 420, the status of the selected atomic update structure is checked. If the status is SUCCESS, the recovery proceeds to step 422 where all memory locations marked as controlled by the atomic update structure are updated with respective new values defined in the atomic update structure, the memory locations are committed to persistent memory and the operation proceeds to step 430. If the status is ACTIVE, the recovery proceeds to step 424 where all memory locations marked as controlled by the atomic update structure are updated with respective old values defined in the atomic update structure, the memory locations are committed to persistent memory and the operation proceeds to step 430. If the status is FAILED, the recovery proceeds to step 230.

Figure 4:
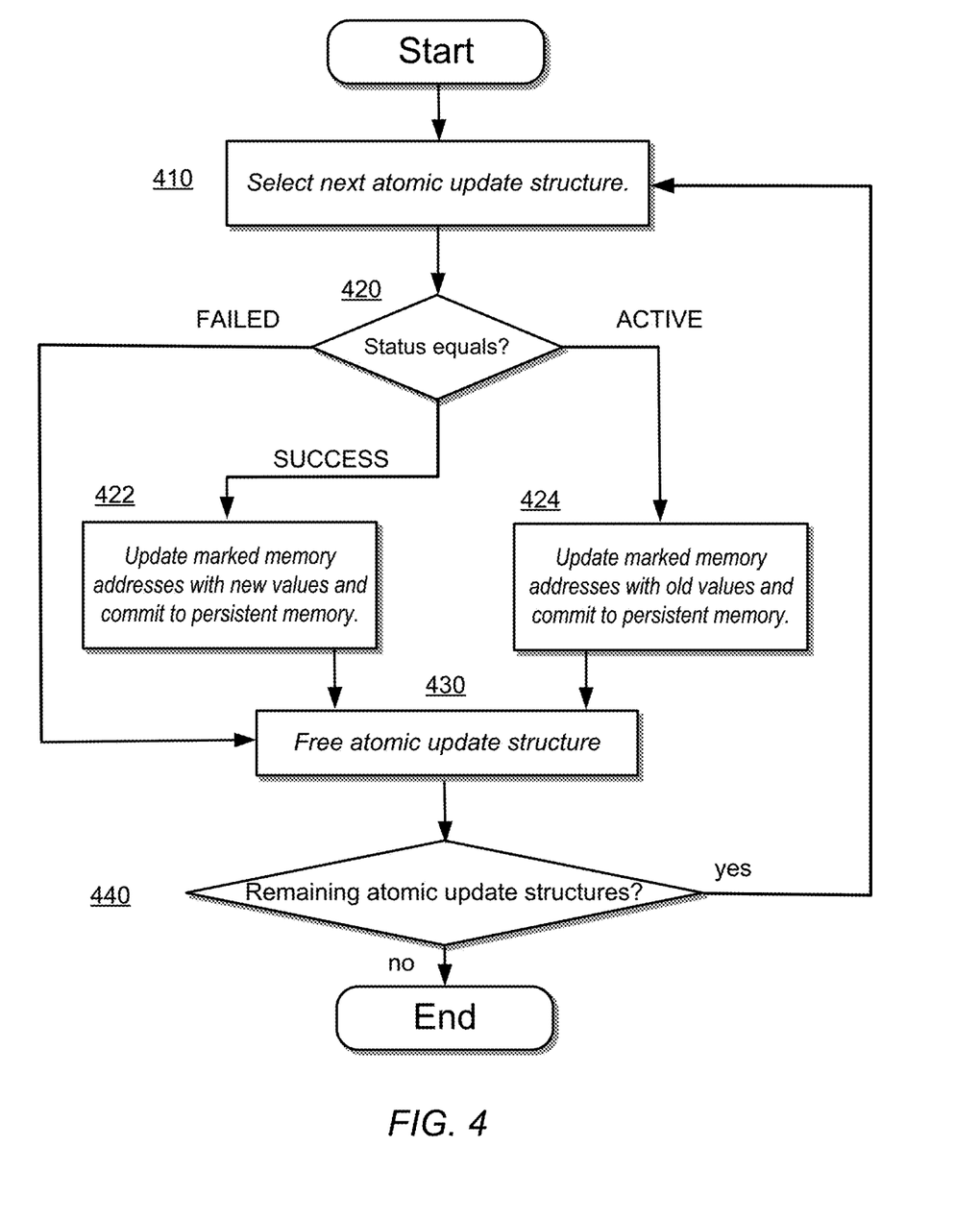
FIG. 4 is a flow diagram of a recovery operation for interrupted PMCAS operations according to some embodiments.

In step 430, the atomic update structure is removed from the list of active structures and the structure freed, then the operation proceeds to step 440 where a check for additional atomic update structures is made. If any structures remain, the process returns to step 410, otherwise the recovery operation ends.

Figure 5:
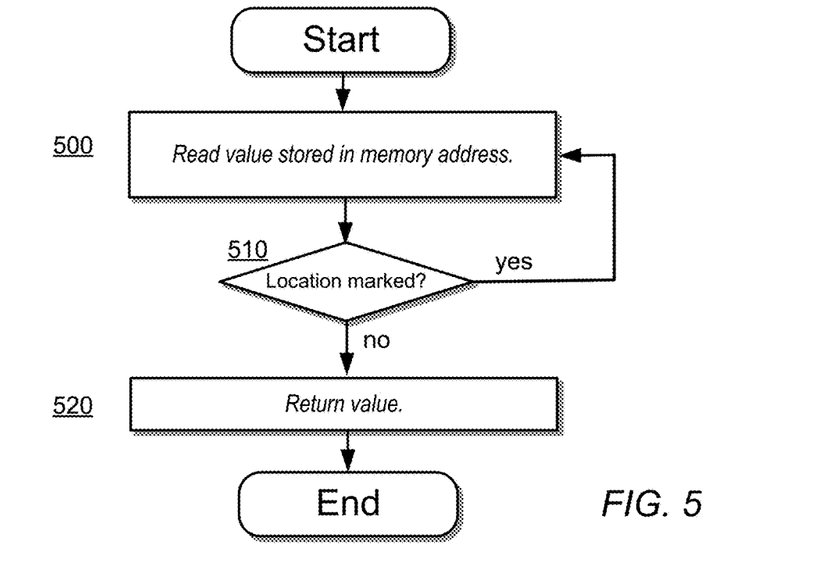
FIG. 5 is a flow diagram of a read of a persistent memory word within memory managed by PMCAS operations according to one embodiment.

FIG. 5 provides a flow diagram of a read of a memory word contained within persistent memory managed by PMCAS operations in one embodiment. As memory words must be updated atomically by the PMCAS operations, any memory word that currently under control of an active atomic update operation cannot be read. Therefore, reads of those memory words must be block until control of the words are relinquished by the PMCAS operation. In step 500, the value of the specified memory location is read, then the operation proceeds to step 520 where the location is checked to determine if the location is marked as being controlled by an active atomic update structure. If the location is marked, the process returns to step 500, otherwise the process continues to step 520 where the value is returned and the process ends.

Figure 6:
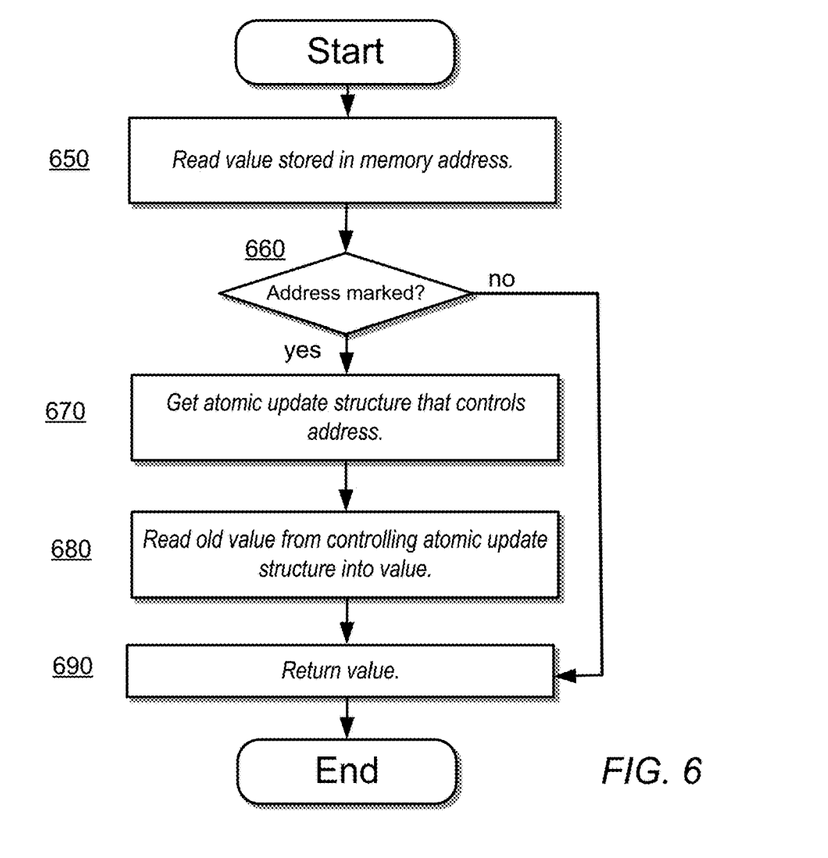
FIG. 6 is a flow diagram of a non-blocking read of a persistent memory word within memory managed by PMCAS operations according to one embodiment.

FIG. 6 provides a flow diagram of a non-blocking read of a memory word contained within persistent memory managed by PMCAS operations in one embodiment. This process relies on the controlling atomic update structure of a marked memory location containing the old value (and therefore the value to be returned) of the memory location. In step 650, the value of the specified memory location is read, then the operation proceeds to step 660 where the location is checked to determine if the location is marked as being controlled by an active atomic update structure. If the location is not marked, the operation proceeds to step 690 where the value is returned and the process ends. If the location is marked, the controlling atomic update structure for the location is retrieved in step 670 by unmarking the value read from the memory location. The old value of the memory location is then read in step 680 from the controlling atomic update structure and replaces the value loaded in step 650. The operation then proceeds to step 690 where the value is returned and the process ends.

Non-blocking reads of memory locations may benefit performance in some applications, however implementation of non-blocking reads may introduce a race condition between the accessing of the controlling atomic update structure and the freeing of that structure. Implementation of a solution to the race condition is dependent on the particular development and runtime environments of the application, particularly if the environment includes managed memory, but the controlling atomic update structure cannot be freed until both the controlling atomic update operation is completed and any non-blocking reads that may reference the controlling atomic update structure have also completed.

Illustrative System

Figure 7:
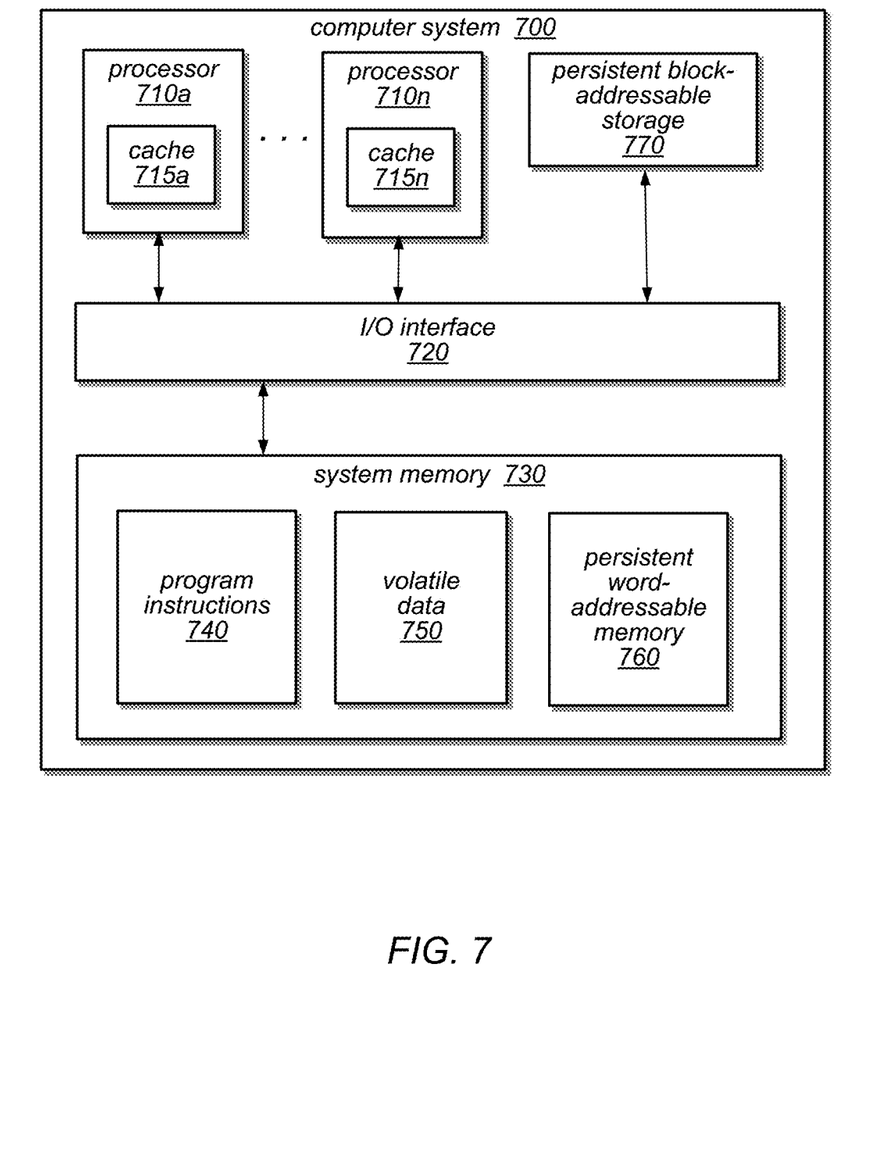
FIG. 7 is a block diagram illustrating a computer system configured to implement at least a portion of a system that may include request routers, servers, and a separate distributed storage service, according to various embodiments.

FIG. 7 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various of the illustrated embodiments may include one or more computer systems 700 such as that illustrated in FIG. 7 or one or more components of the computer system 700 that function in a same or similar way as described for the computer system 700. In the illustrated embodiment, computer system 700 includes one or more processors 710 coupled to a system memory 730 via an input/output (I/O) interface 720. In some embodiments, computer system 700 may be illustrative of servers implementing enterprise logic or downloadable applications, while in other embodiments servers may include more, fewer, or different elements than computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions including HTM instructions, CAS instructions, or both HTM and CAS instructions. Each processor may include multiple cores, any of which may be single- or multi-threaded. Each of the processors 710 may include a cache or a hierarchy of caches 715, in various embodiments. For example, each processor chip 710 may include multiple L1 caches (e.g., one per processor core) and one or more other caches (which may be shared by the processor cores on a single processor).

System memory 730 may be configured to store instructions and data accessible by processor 710. In various embodiments, system memory 730 may include any suitable memory technology, such as static random-access memory (SRAM), synchronous dynamic RAM (SDRAM), or any other type of memory. Additionally, system memory 730 may include any suitable persistent word-addressable memory 760 such as 3D) (Point memory, phase change memory, magneto-resistive random access memory or memristors, In the illustrated embodiment, program instructions and data implementing desired functions, such as those methods and techniques described above are stored within system memory 730 as program instructions 740 and volatile data 750.

In one embodiment, I/O interface 720 may be configured to coordinate I/O traffic between processor 710, system memory 730 and any peripheral devices in the system. In some embodiments, I/O interface 720 may perform any necessary protocol, timing or other data transformations to convert data signals from one component (e.g., system memory 730) into a format suitable for use by another component (e.g., processor 710). In some embodiments, I/O interface 720 may include support for devices attached through various types of peripheral buses, such as a variant of the Peripheral Component Interconnect (PCI) bus standard or the Universal Serial Bus (USB) standard, for example. In some embodiments, the function of I/O interface 720 may be split into two or more separate components, such as a north bridge and a south bridge, for example. Also, in some embodiments, some or all of the functionality of I/O interface 720, such as an interface to system memory 730, may be incorporated directly into processor 710.

In some embodiments, system memory 730 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 700 via I/O interface 720. A computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 730 or another type of memory. Further, a computer-accessible medium may include transmission media or signals such as electrical, electromagnetic, or digital signals, conveyed via a communication medium such as a network and/or a wireless link.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed:

1. A method, comprising:
    recovering an interrupted persistent atomic compare and swap operation on a plurality of data elements, comprising:
        accessing an atomic update structure stored in a persistent memory to determine one or more memory locations controlled by the interrupted persistent atomic compare and swap operation;
        for individual ones of the determined one or more memory locations:
            updating the respective memory location with a respective new value for the memory location responsive to determining that a status value of the interrupted persistent atomic compare and swap operation stored in the atomic update structure indicates successful completion; and
            updating the respective memory location with a respective old value for the memory location responsive to determining that the status value of the interrupted persistent atomic compare and swap operation stored in the atomic update structure indicates active operation; and
        removing the atomic update structure from the persistent memory.

2. The method of claim 1, wherein:
    the interrupted persistent atomic compare and swap operation is one of a plurality of interrupted persistent atomic compare and swap operations;
    respective atomic update structures for individual ones of the plurality of interrupted persistent atomic compare and swap operations are stored in a list in the persistent memory; and
    the recovering, accessing and updating are performed for the individual ones of the plurality of interrupted persistent atomic compare and swap operations.

3. The method of claim 1, wherein:
    the atomic update structure comprises a plurality of indicators of memory locations; and
    determining that the one or more memory locations are controlled by the interrupted persistent atomic compare and swap operation comprises accessing individual ones of the plurality of indicators of memory locations to determine that the one or more respective memory locations are controlled by the interrupted persistent atomic compare and swap operation.

4. The method of claim 3, wherein individual ones of the plurality of indicators comprise an address of the atomic update structure and an indicator of control by the atomic update structure.

5. The method of claim 1, wherein the atomic update structure comprises respective old values and respective new values for the individual ones of the one or more determined memory locations.

6. The method of claim 1, wherein the method is performed by a computing device comprising the persistent memory, and wherein the recovering of the interrupted persistent atomic compare and swap operation is performed responsive to a previous failure of the computing device.

7. The method of claim 1, wherein for individual ones of the one or more determined memory locations the respective memory location is not updated responsive to determining that the status value of the interrupted persistent atomic compare and swap operation stored in the atomic update structure indicates failure.

8. One or more non-transitory computer-accessible storage media storing program instructions that when executed on or across one or more processors cause the one or more processors to perform:
    recovering an interrupted persistent atomic compare and swap operation on a plurality of data elements, comprising:
        accessing an atomic update structure stored in a persistent memory to determine one or more memory locations controlled by the interrupted persistent atomic compare and swap operation;
        for individual ones of the one or more determined memory locations:
            updating the respective memory location with a respective new value for the memory location responsive to determining that a status value of the interrupted persistent atomic compare and swap operation stored in the atomic update structure indicates successful completion; and
            updating the respective memory location with a respective old value for the memory location responsive to determining that the status value of the interrupted persistent atomic compare and swap operation stored in the atomic update structure indicates active operation; and
        removing the atomic update structure from the persistent memory.

9. The one or more non-transitory computer-accessible storage media of claim 8, wherein:
    the interrupted persistent atomic compare and swap operation is one of a plurality of interrupted persistent atomic compare and swap operations;
    respective atomic update structures for individual ones of the plurality of interrupted persistent atomic compare and swap operations are stored in a list in the persistent memory; and
    the recovering, accessing and updating are performed for the individual ones of the plurality of interrupted persistent atomic compare and swap operations.

10. The one or more non-transitory computer-accessible storage media of claim 8, wherein:

the atomic update structure comprises a plurality of indicators of memory locations; and determining that the one or more memory locations are controlled by the interrupted persistent atomic compare and swap operation comprises accessing individual ones of the plurality of indicators of memory locations to determine that the one or more respective memory locations are controlled by the interrupted persistent atomic compare and swap operation.

11. The one or more non-transitory computer-accessible storage media of claim 10, wherein individual ones of the plurality of identifiers indicators comprise an address of the atomic update structure and an indicator of control by the atomic update structure.

12. The one or more non-transitory computer-accessible storage media of claim 8, wherein the atomic update structure comprises respective old values and respective new values for the individual ones of the one or more determined memory locations.

13. The one or more non-transitory computer-accessible storage media of claim 8, wherein the recovering of the interrupted persistent atomic compare and swap operation is performed responsive to a previous failure of a computing device comprising the one or more processors.

14. The one or more non-transitory computer-accessible storage media of claim 8, wherein for individual ones of the one or more determined memory locations the respective memory location is not updated responsive to determining that the status value of the interrupted persistent atomic compare and swap operation stored in the atomic update structure indicates failure.

15. A system, comprising:
one or more processors, a persistent memory and a memory, the memory comprising program instructions executable by the one or more processors to perform a recovery of an interrupted persistent atomic compare and swap operation, the recovery of an interrupted persistent atomic compare and swap operation configured to:
access an atomic update structure stored in a persistent memory to determine one or more memory locations controlled by the interrupted persistent atomic compare and swap operation;
for individual ones of the one or more determined memory locations:
update the respective memory location with a respective new value for the memory location responsive to determining that a status value of the interrupted persistent atomic compare and swap operation stored in the atomic update structure indicates successful completion; and
update the respective memory location with a respective old value for the memory location responsive to determining that the status value of the interrupted persistent atomic compare and swap operation stored in the atomic update structure indicates active operation; and
remove the atomic update structure from the persistent memory.

16. The system of claim 15, wherein:
the interrupted persistent atomic compare and swap operation is one of a plurality of interrupted persistent atomic compare and swap operations;
respective atomic update structures for individual ones of the plurality of interrupted persistent atomic compare and swap operations are stored in a list in the persistent memory; and
the recovering, accessing and updating are performed for the individual ones of the plurality of interrupted persistent atomic compare and swap operations.

17. The system of claim 15, wherein:
the atomic update structure comprises a plurality of indicators of memory locations; and
determining that the one or more memory locations are controlled by the interrupted persistent atomic compare and swap operation comprises accessing individual ones of the plurality of indicators of memory locations to determine that the one or more respective memory locations are controlled by the interrupted persistent atomic compare and swap operation.

18. The system of claim 17, wherein individual ones of the plurality of indicators comprise an address of the atomic update structure and an indicator of control by the atomic update structure.

19. The system of claim 15, wherein the atomic update structure comprises respective old values and respective new values for the individual ones of the one or more determined memory locations.

20. The system of claim 15, wherein the recovering of the interrupted persistent atomic compare and swap operation is performed responsive to a previous failure of the system.

* * * * *

UNITED STATES PATENT AND TRADEMARK OFFICE
CERTIFICATE OF CORRECTION

PATENT NO. : 11,321,117 B2
APPLICATION NO. : 16/894626
DATED : May 3, 2022
INVENTOR(S) : Marathe et al.

It is certified that error appears in the above-identified patent and that said Letters Patent is hereby corrected as shown below:

On the Title Page

On page 2, Column 2, under Other Publications, Line 47, delete "PublishingGroup," and insert -- Publishing Group, --, therefor.

In the Specification

In Column 10, Line 34, delete "3D) (Point" and insert -- 3D XPoint --, therefor.

In Column 10, Lines 35-36, delete "memristors," and insert -- memristors. --, therefor.

In the Claims

In Column 13, Line 12, in Claim 11, delete "of identifiers" and insert -- of --, therefor.

Signed and Sealed this
Thirtieth Day of August, 2022

Katherine Kelly Vidal
*Director of the United States Patent and Trademark Office*